United States Patent
Kosugi

(10) Patent No.: US 8,465,862 B2
(45) Date of Patent: Jun. 18, 2013

(54) BATTERY PACK

(75) Inventor: Shinichiro Kosugi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 344 days.

(21) Appl. No.: 12/708,656

(22) Filed: Feb. 19, 2010

(65) Prior Publication Data
US 2010/0151313 A1 Jun. 17, 2010

Related U.S. Application Data

(63) Continuation-in-part of application No. PCT/JP2008/002245, filed on Aug. 20, 2008.

(30) Foreign Application Priority Data

Sep. 27, 2007 (JP) .................................. 2007-251599

(51) Int. Cl.
*H01M 2/10* (2006.01)
*B65D 85/00* (2006.01)
*B65H 1/00* (2006.01)

(52) U.S. Cl.
USPC ................. 429/100; 429/96; 429/97; 429/98; 429/99; 206/703; 221/282

(58) Field of Classification Search
None
See application file for complete search history.

(56) References Cited

U.S. PATENT DOCUMENTS

| 2005/0202315 A1* | 9/2005 | Sugeno et al. ................ 429/156 |
| 2005/0231158 A1 | 10/2005 | Higashino |
| 2005/0260488 A1* | 11/2005 | Zhou et al. ..................... 429/99 |
| 2008/0171259 A1 | 7/2008 | Kanai et al. |
| 2009/0305125 A1 | 12/2009 | Kosugi et al. |

FOREIGN PATENT DOCUMENTS

| EP | 1 583 170 A2 | 10/2005 |
| EP | 1 583 170 A3 | 10/2005 |
| EP | 1 744 383 A1 | 1/2007 |
| JP | 11-045689 A | 2/1999 |
| JP | 2003-059471 A | 2/2003 |
| JP | 2003-323871 A | 11/2003 |
| JP | 2004-281099 A | 10/2004 |
| JP | 2006-339032 | 12/2006 |
| JP | 2007-200758 | 8/2007 |

OTHER PUBLICATIONS

Extended European Search Report Issued Dec. 19, 2012 in Patent Application No. 08834362.9.

* cited by examiner

*Primary Examiner* — Cynthia Walls
(74) *Attorney, Agent, or Firm* — Oblon, Spivak, McClelland, Maier & Neustadt, L.L.P.

(57) ABSTRACT

A battery pack includes: a plurality of unit batteries each having a rectangular-solid sealed metal unit battery case and two voltage terminals protruding from a terminal surface of the unit battery case; a spacer arranged between two main surfaces of adjacent unit batteries opposing to each other so as to maintain a gap between the main surfaces; and a connection portion which electrically connects the voltage terminals of different unit batteries. The spacer has a plurality of protrusions for supporting the corner portions of the unit battery cases and through holes formed at positions opposing to the main surfaces which can receive expanded portions when the main surfaces of the unit battery cases are expanded by inner pressure of the unit battery cases.

9 Claims, 4 Drawing Sheets

BATTERY PACK

CROSS REFERENCES TO RELATED APPLICATIONS

This application is a continuation-in-part (CIP) application based upon the International Application PCT/JP2008/002245, the International Filing Date of which is Aug. 20, 2008, the entire content of which is incorporated herein by reference, and claims the benefit of priority from the prior Japanese Patent Application No. 2007-251599, filed in the Japanese Patent Office on Sep. 27, 2007, the entire content of which is incorporated herein by reference.

BACKGROUND OF THE INVENTION

The present invention relates to a battery pack formed by arranging and connecting a plurality of unit batteries and, more particularly, to a battery pack having a structure capable of maintaining safety and efficiency even after a long-term use.

There is known a battery pack formed by arranging a plurality of unit batteries and electrically and mutually connecting the electrodes of the unit batteries, as disclosed in Japanese Patent Application Laid-Open Publications No. 2006-339032 and No. 2007-200758, the entire contents of which are incorporated herein by reference. In this battery pack, it is preferable that the unit batteries be arranged close to each other in order to reduce the size of the entire battery pack.

In the case of, e.g., a lithium-ion battery, it is necessary to prevent entering of water in terms of characteristics of a material thereof and thus a metal unit battery case that does not transmit water is employed.

For example, in the case where an aluminum unit battery case of a sealed type that does not transmit water is employed in the lithium-ion battery, there is a possibility that gas may accumulate in the unit battery case due to a long-term use to increase the inner pressure, resulting in inflation of the unit battery case. Thus, it is necessary to estimate the deformation of the unit battery case and design the structure thereof so as to allow for the deformation. Otherwise, the battery pack may be destroyed before the end of the life of each unit battery, disabling the subsequent use.

BRIEF SUMMARY OF THE INVENTION

The present invention has been made in view of the above situation, and an object thereof is to provide a battery pack formed by arranging and connecting a plurality of unit batteries capable of maintaining safety and efficiency even after a long-term use.

In order to solve the problems, according to the present invention, there is presented a battery pack comprising: a plurality of unit batteries each provided with a rectangular-solid shaped sealed type metal unit battery case and two voltage terminals, the unit battery case having two main surfaces which are larger than other surfaces and extend in parallel and the two voltage terminals projecting from one surface which is not the main surface of the unit battery case; a spacer disposed between two of the main surfaces of two of the unit batteries which are adjacent and opposed to each other so as to maintain the interval between the main surfaces; and a connection unit which electrically connects the voltage terminals of different unit batteries, wherein the spacer has a plurality of protrusions for supporting corner portions of the unit battery cases, and cut portions formed at positions opposed to the main surfaces which can receive inflated portions when the main surfaces of the unit battery cases are inflated by inner pressure of the unit battery cases.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION OF THE INVENTION

Figure 1:
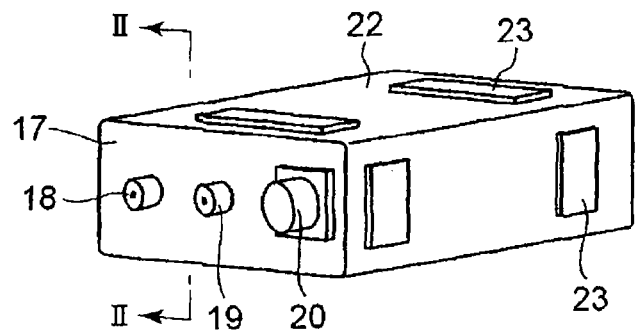
FIG. 1 is a perspective view showing an embodiment of a battery pack according to the present invention.
Figure 2:
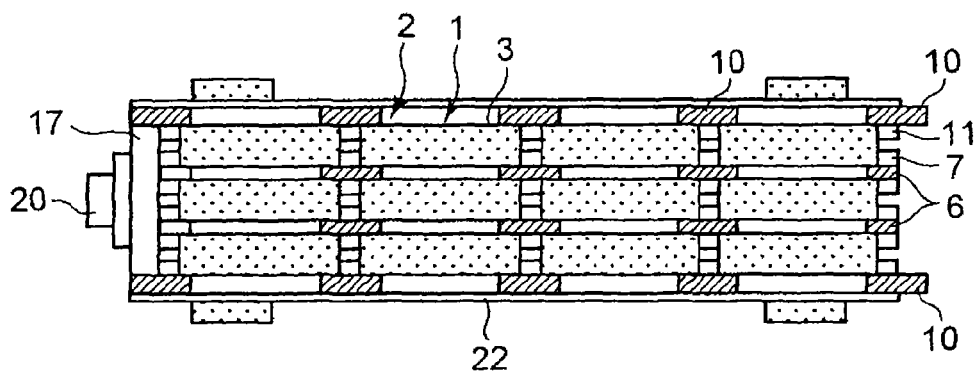
FIG. 2 is a sectional elevation view of the battery pack taken along the II-II line of FIG. 1.
Figure 3:
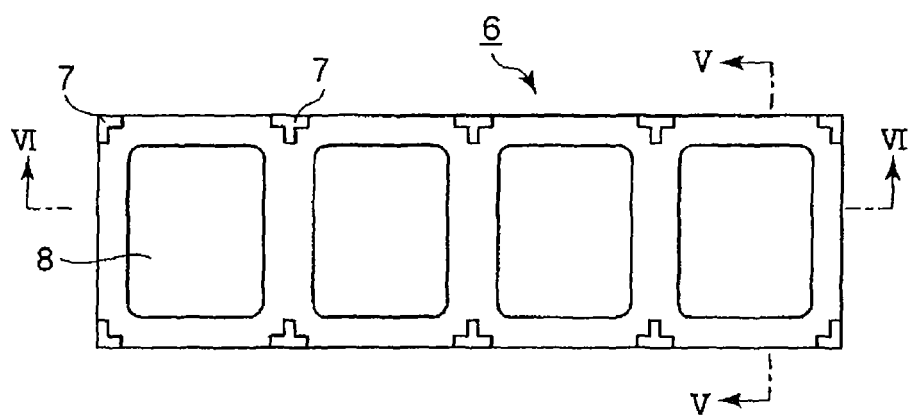
FIG. 3 is a plan view showing an example of a spacer used in the battery pack of FIG. 1.
Figure 4:
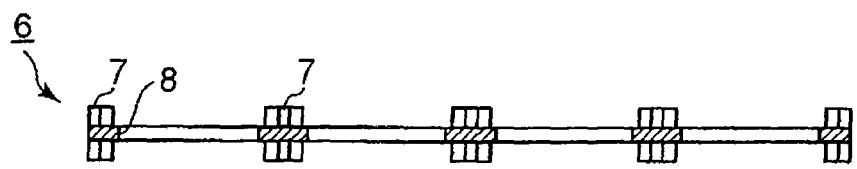
FIG. 4 is a sectional elevation view taken along the IV-IV line of FIG. 3.
Figure 5:
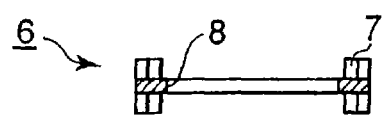
FIG. 5 is a sectional elevation view taken along the V-V line of FIG. 3.
Figure 6:
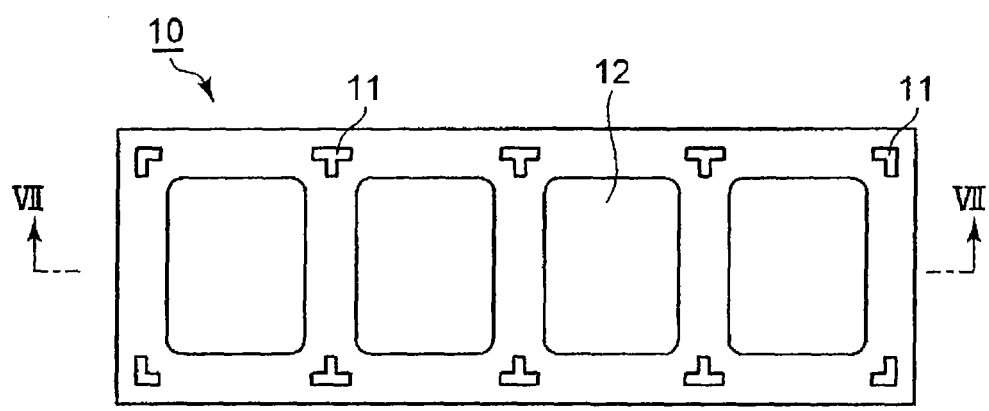
FIG. 6 is a plan view showing an example of an upper/lower plate used in the battery pack of FIG. 1.
Figure 7:
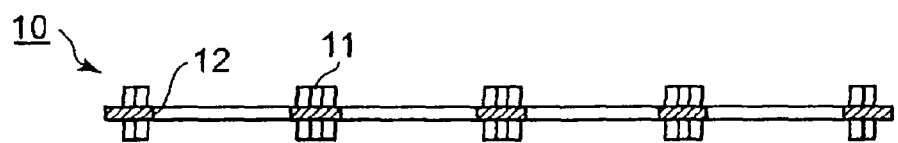
FIG. 7 is a sectional elevation view taken along the VII-VII line of FIG. 6.
Figure 8:
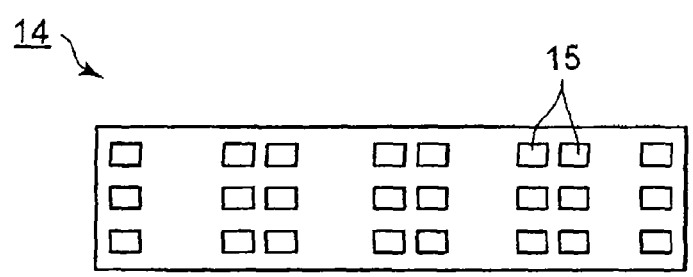
FIG. 8 is an elevation view showing an example of an insulating plate used in the battery pack of FIG. 1.

With reference to the accompanying drawings, an embodiment of a battery pack according to the present invention will be described. FIG. 1 is a perspective view showing a battery pack according to the present embodiment, and FIG. 2 is a sectional elevation view of the battery pack taken along the II-II line of FIG. 1. FIG. 3 is a plan view showing an example of a spacer used in the battery pack according to the present embodiment, FIG. 4 is a sectional elevation view taken along the IV-IV line of FIG. 3, and FIG. 5 is a sectional elevation view taken along the V-V line of FIG. 3. FIG. 6 is a plan view showing an example of an upper/lower plate used in the battery pack according to the present embodiment, and FIG. 7 is a sectional elevation view taken along the VII-VII line of FIG. 6. FIG. 8 is an elevation view showing an example of an insulating plate used in the battery pack according to the present embodiment. FIGS. 9 to 12 are perspective views showing a procedure of assembling the battery pack according to the present embodiment.

In the battery pack of the present embodiment, four unit batteries 1 are arranged horizontally and three unit batteries 1 are arranged vertically. That is, twelve unit batteries 1 are arranged in total. Each unit battery 1 is, e.g., a lithium-ion battery and has a rectangular-solid shaped unit battery case 2 made of aluminum. The unit battery case 2 has a flattened shape, and the upper and lower surfaces (main surfaces) are larger than other surfaces. Two voltage terminals 5 project from one surface (terminal surface) 4 of the two smallest surfaces of each unit battery 1.

A spacer 6 is disposed between the two main surfaces 3 of two adjacent unit batteries 1 which are opposed to each other.

The spacer 6 is made of electrically insulating material such as polypropylene or polycarbonate resin and has substantially a rectangular flat plate shape. A plurality of projections 7 for retaining the corner portions of the plurality of unit batteries 1 are formed on both sides of the spacer 6. Further, at the positions facing the main surfaces 3 of each of the unit batteries 1, cut portions are formed. The cut portions may be through holes 8 shaped in rectangles, each having a size slightly smaller than the main surface 3

Two upper/lower plates 10 are disposed in parallel to the spacer 6 so as to be opposed to the outermost main surfaces 3 of the unit batteries 1 that are not opposed to the main surfaces 3 of the other unit batteries 1. That is, the entire arrangement of the unit batteries 1 is sandwiched between the two upper/lower plates 10. Like the spacers 6, the upper/lower plates 10 are made of electrically insulating material such as polypropylene or polycarbonate resin, and each has substantially a rectangular flat plate shape. A plurality of projections 11 for retaining the corner portions of the unit batteries 1 are formed on the surfaces of each of the upper/lower plates 10 that are opposed to the main surfaces 3 of the unit batteries 1. Further, at the positions facing the main surfaces 3, cut portions are formed. The cut portion may be through holes 12 shaped in rectangles, each having a size slightly smaller than the main surface 3.

The unit batteries 1 are arranged between one of the upper/lower plates 10 and one of the spacers 6 or between two of the spacers 6 such that elongated surfaces 13 of the unit batteries 1 adjacent to the main surfaces 3 and the terminal surfaces 4 are opposed to each other in parallel.

The terminal surfaces 4 of the unit batteries 1 are positioned in the same plane, and a rectangular insulating plate 14 (FIG. 12) is disposed so as to cover the entire terminal surface 4. The insulating plate 14 is made of, e.g., epoxy resin or a paper having a slightly higher stiffness and has a plurality of terminal holes 15 through which the voltage terminals 5 penetrate the insulating plate 14. Preferably, the insulating plate 14 is a circuit board on which a circuit is printed, through which respective elements on the circuit board and voltage terminals 5 are electrically connected to each other so as to establish electrical connection between the voltage terminals 5.

A rectangular connector substrate 17 (FIGS. 1 and 2) is disposed outside relative to the one of the side surfaces 13 of the outermost unit batteries 1. A discharge connector 18, a charge connector 19, and a communication/voltage measurement connector 20 are mounted on the connector substrate 17. The discharge connector 18 and the charge connector 19 each have positive and negative electrodes each of which are electrically connected (not shown) to the voltage terminals 5 of each unit battery 1. The communication/voltage measurement connector 20 includes a number of terminals (not shown) which are individually connected to the voltage terminals 5 of each unit battery 1, and the voltage of each unit battery 1 can be individually measured by means of an external measurement device (not shown).

The outer peripheral portions of the upper/lower plates 10 sandwiching the entire arrangement of the unit batteries 1 is covered by, e.g., a heat-shrinkable shrink tube 22. However, the outside of the portion of the connector substrate 17 is not covered by the shrink tube 22. Further, a plurality of sponge pads 23 are adhered to the outside of the shrink tube 22 so as to protect the battery pack from a mechanical impact applied at the time when the battery pack is inserted into a device.

An assembly procedure of the battery pack according to the embodiment will next be described with reference to FIGS. 9 to 12.

Figure 9:
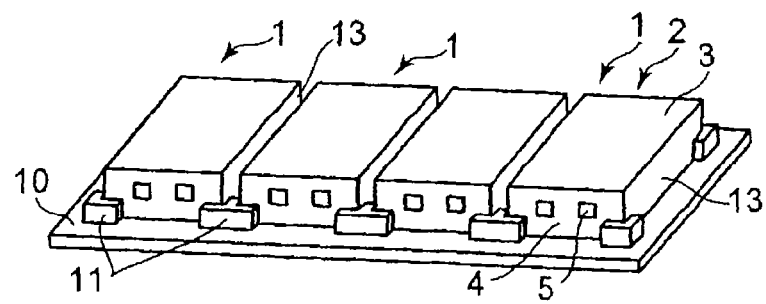
FIG. 9 is a perspective view showing a state during assembly of the battery pack of FIG. 1.

First, as shown in FIG. 9, one of the upper/lower plate 10 is set such that the projections 11 face upward. On the upper/lower plate 10, the unit batteries 1 of the first row from the bottom are arranged such that the main surfaces 3 thereof face upward, the side surfaces 13 of the adjacent unit batteries 1 are opposed to each other, and the terminal surfaces 4 of the unit batteries 1 are positioned on a same plane. The corner portions of each unit battery 1 are retained by the projections 11.

Figure 10:
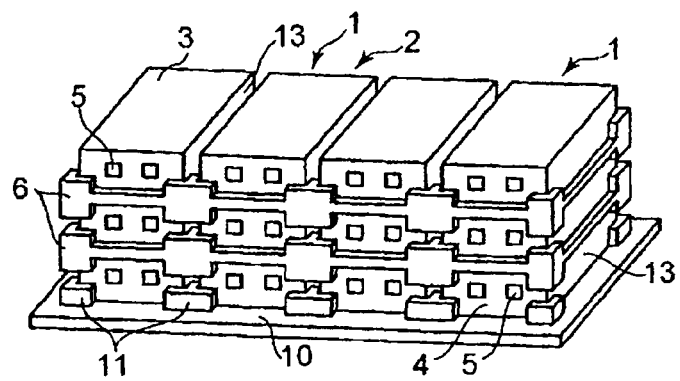
FIG. 10 is a perspective view showing a state during assembly of the battery pack of FIG. 1 continued from FIG. 9.

Then, as shown in FIG. 10, a lower spacer 6 is disposed on the unit batteries 1 of the first row from the bottom. Further, the unit batteries 1 of the second from the bottom are arranged on the lower spacer 6 so as to make them parallel to the unit batteries 1 of the first row from the bottom and make the terminal surfaces 4 thereof be positioned in the same plane as those of the unit batteries 1 of the first row from the bottom. Similarly, an upper spacer 6 is disposed on the unit batteries 1 of the second row from the bottom, and unit batteries 1 of the third row are arranged on the upper spacer 6.

Figure 11:
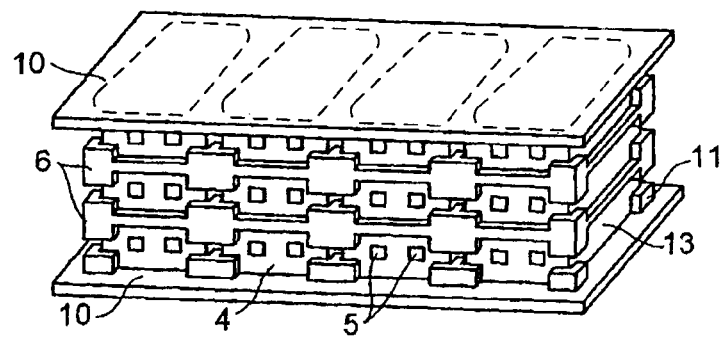
FIG. 11 is a perspective view showing a state during assembly of the battery pack of FIG. 1 continued from FIG. 10.

Then, as shown in FIG. 11, the remaining one of the upper/lower plates 10 is disposed on the unit batteries 1 of the third row such that the projections 11 face downward.

Figure 12:
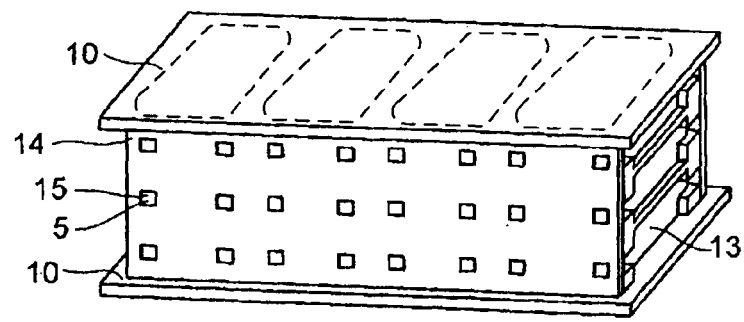
FIG. 12 is a perspective view showing a state during assembly of the battery pack of FIG. 1 continued from FIG. 11.

Subsequently, as shown in FIG. 12, the insulating plate 14 is disposed so as to cover the terminal surfaces 4 and make the voltage terminals 5 penetrate the insulating plate 14 through the terminal holes 5.

Thereafter, the voltage terminals 5 are electrically connected (not shown) appropriately, and the connector substrate 17 is disposed outside relative to the side surfaces 13 of the outermost unit batteries 1. Then, the outside of the resultant structure, including the outer peripheral portions of the upper/lower plates 10 sandwiching the entire arrangement of the unit batteries 1 but except for the outside of the connector substrate 17, is covered by the shrink tube 22. Further, the plurality of sponge pads 23 are adhered to the outside of the shrink tube 22, whereby the state shown in FIGS. 1 and 2 is obtained.

According to the embodiment described above, when the inner pressures of the unit batteries 1 are increased to cause the main surfaces 3 thereof are inflated outward after a long term use of the battery pack, existence of the through holes 8 and 12 of the spacer 6 and upper/lower plates 10 can prevent the inflated portions of the main surfaces 3 from interfering with each other or with spacer 6 and the upper/lower plates 10. As a result, it is possible to prevent the entire battery pack from being mechanically destroyed, thereby maintaining safety and efficiency of the battery pack.

In the above embodiment, the cut portions such as the through holes are formed in the spacer 6 and the upper/lower plates 10 so as to prevent the interference of the inflated portions of the main surfaces 3. Alternatively, however, depressions or the like may be formed in place of the through holes as a modification of the cut portions. Also in this case, the same effect as above can be obtained.

Although the terms "upper" and "lower" are used for convenience of the explanation in the above description, either side may face up from the structural view pint of the battery pack.

What is claimed is:

1. A battery pack comprising:
a plurality of unit batteries each provided with a rectangular-solid shaped sealed type metal unit battery case and two voltage terminals, the unit battery case having two main surfaces which are larger than other surfaces and extend in parallel and the two voltage terminals projecting from one surface which is not the main surface of the unit battery case;

at least one spacer, each disposed between two of the main surfaces of two of the unit batteries which are adjacent and opposed to each other so as to maintain the interval between the main surfaces;

a connection unit which electrically connects the voltage terminals of different unit batteries; and two upper/lower plates disposed opposite to outside of the main surfaces of the unit batteries that are not opposed to the main surfaces of other unit batteries, wherein the spacer has a plurality of protrusions for supporting corner portions of each of the unit battery cases, and cut portions formed at positions opposed to the main surfaces which can receive inflated portions when the main surfaces of the unit battery cases are inflated by inner pressure of the unit battery cases such that the unit battery cases are aligned along the spacer and the voltage terminals are aligned in a common flat plane, one of the plurality of protrusions supporting two adjacent unit battery cases in the common flat plane and two adjacent unit battery cases in another common flat plane that is directly beneath the common flat plane; and the two upper/lower plates are opposed to the spacer with the unit battery cases therebetween, such that the two upper/lower plates do not contact each other, and the upper/lower plates and the spacer do not contact each other.

2. The battery pack according to claim 1, wherein the at least one spacer includes a plurality of spacers, and some of the unit battery cases are aligned along the spacers between the spacers in such a way that the spacers do not contact each other.

3. The battery pack according to claim 1, wherein the upper/lower plates each has a plurality of protrusions for supporting corner portions of the unit battery cases and cut portions formed at positions opposed to the main surfaces which receive inflated portions when the main surfaces of the unit batter cases are inflated by an inner pressure of the unit battery cases.

4. The battery pack according to claim 1, wherein the unit batteries are lithium-ion batteries.

5. The battery pack according to claim 1, wherein the unit battery cases are made of aluminum.

6. The battery pack according to claim 1, wherein the cut portions are rectangularly shaped through holes.

7. The battery pack according to claim 1, wherein each of the cut portions are aligned with each of the unit battery cases.

8. The battery pack according to claim 1, wherein the spacer extends beyond the length of the unit battery cases aligned in the common flat plane.

9. The battery pack according to claim 1, wherein end protrusions of the plurality of protrusions support one unit battery case in the common flat plane and one unit battery case in the other common flat plane.

* * * * *